(12) United States Patent
Ershov

(10) Patent No.: US 8,539,475 B2
(45) Date of Patent: Sep. 17, 2013

(54) API BACKWARD COMPATIBILITY CHECKING

(75) Inventor: Mikhail K. Ershov, St. Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 1006 days.

(21) Appl. No.: 12/569,424

(22) Filed: Sep. 29, 2009

(65) Prior Publication Data

US 2011/0078674 A1    Mar. 31, 2011

(51) Int. Cl.
*G06F 9/44* (2006.01)

(52) U.S. Cl.
USPC .......................................................... 717/170

(58) Field of Classification Search
USPC .......................................................... 717/170
See application file for complete search history.

(56) References Cited

U.S. PATENT DOCUMENTS

| | | | |
|---|---|---|---|
| 6,983,399 B2 | 1/2006 | Dochez et al. | |
| 6,986,132 B1 * | 1/2006 | Schwabe | 717/170 |
| 7,257,772 B1 * | 8/2007 | Jones et al. | 715/234 |
| 7,383,587 B2 * | 6/2008 | Watt et al. | 726/30 |
| 7,895,315 B2 * | 2/2011 | Weinrich et al. | 709/224 |
| 2005/0188356 A1 * | 8/2005 | Lwo | 717/120 |
| 2005/0289534 A1 * | 12/2005 | Kim et al. | 717/172 |
| 2006/0259911 A1 * | 11/2006 | Weinrich et al. | 719/315 |
| 2007/0192872 A1 * | 8/2007 | Rhoads et al. | 726/26 |
| 2008/0082974 A1 * | 4/2008 | Ellison | 717/170 |
| 2008/0134156 A1 | 6/2008 | Osminer et al. | |
| 2010/0218169 A1 * | 8/2010 | Andersen et al. | 717/125 |

OTHER PUBLICATIONS

"Japitools: Java API compatibility testing tools," Copyright 2000-2006, found at http://sab39.netreach.com/Software/Japitools/42/.
"OS Java," Last published: Feb. 20, 2006/Doc for v0.Osjava, found at http://www.osjava.org/jardiff/.
"Java API Signature verification," Jour, Last Published: Dec. 12, 2008, found at http://jour.sourceforge.net/signature. html.
Sun Microsystems, Inc., "SigTest Tool 2.0 User's Guide: For Java™Compatibility Test Suite Developers," Apr. 2008.
U.S. Appl. No. 11/180,819, filed Jul. 13, 2005.

* cited by examiner

*Primary Examiner* — Anna Deng
*Assistant Examiner* — Junchun Wu
(74) *Attorney, Agent, or Firm* — Robert C. Kowert; Meyertons, Hood, Kivlin, Kowert & Goetzel, P.C.

(57) ABSTRACT

A system and method for automatically determining whether a newer version of an application programming interface (API) is backwards compatible with an older version is disclosed. The method includes comparing the two versions of the API to determine a set of atomic differences between the two versions and applying a set of backwards compatibility rules to the set of atomic differences. For each atomic difference, applying the rules includes analyzing the atomic difference to determine any applicable backwards compatibility rules and evaluating each applicable rule for the atomic difference to determine whether the atomic difference represents a violation. The method also includes storing an indication of any backwards compatibility violations from the evaluation.

19 Claims, 6 Drawing Sheets

API BACKWARD COMPATIBILITY CHECKING

BACKGROUND

Software applications, components of applications, software platforms, and/or other software entities are often configured to expose an application programming interfaces (API) that may enable other entities (e.g., other programs, components, scripts, etc.) to interact with the API-exposing entity. An API may essentially outline the vocabulary and/or calling conventions that others should employ in order to use the software services offered by the software entity. For example, an API may expose various functions provided by a software platform that an application may invoke. If a software entity attempts to invoke a function not exposed by the API, an error may occur, such as a compilation or runtime error.

In practice, a software entity's API often evolves with subsequent versions. For example, subsequent versions of a software platform may provide more and/or better functionality through a modified API. However, if the new API does not provide, for example, the same methods as the old API, then some software applications and/or components that were configured to interface with the old API may malfunction when the newer version is introduced. Therefore, when releasing a new version of an API, it may be desirable to determine whether the new version is backwards compatible with an older version.

SUMMARY

A system and method for automatically determining whether a new version of an application programming interface (API) is backwards compatible with an earlier version of the API is disclosed. The method includes comparing the two versions of the API to determine a set of atomic differences between the two versions and applying a set of backwards compatibility rules to the set of atomic differences. For each atomic difference, applying the rules includes analyzing the atomic difference to determine any applicable backwards compatibility rules and evaluating each applicable rule for the atomic difference to determine whether the atomic difference represents a violation. The method also includes storing an indication of any backwards compatibility violations from the evaluation.

In some embodiments, said applying includes grouping two or more of the set of atomic differences as a modification to a single, common member of the first and second versions of the API. It may then be determined whether the modification violates any of the set of backwards compatibility rules. In some embodiments, the modification violates a backwards compatibility rule if it matches one or more modification templates of the backwards compatibility rules.

In various embodiments, the particular backwards compatibility rules may be selected dependent on the programming language and/or platform in which the API is implemented. Each backwards compatibility rule may include a modification template, such that a modification matching the template is determined to violate the backwards compatibility rule. In some embodiments, modification templates may include a subject, condition for violation, and/or exceptions to the rule. In some embodiments, each rule may also be associated with a severity (e.g., warning, critical) and/or a scope (e.g., source code, binary compatibility problems).

In some embodiments, the method may further include indicating whether any of the modifications violates one or more of the plurality of rules. For example, a backwards compatibility report may be generated, which may include information such as that indicating which rules are violated, the severity and/or scope of the violation, which modifications caused the violations, etc.

Each of the plurality of rules may be associated with a handler that may be used to determine whether each modification violates the rule. In various embodiments, the modifications may each be handled by every handler sequentially and/or in parallel.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

APIs often evolve with subsequent versions. However, to avoid software malfunctions, it may be desirable for a new API to be backwards compatible with an older version. A new version of an API may be backwards compatible with an older version if an application configured to use the older API can use the newer version of the API without malfunctioning. For example, a new API may be backwards compatible with an older version if the newer version fully supports all of the functions of the older version. In some instances, a software developer of a new API may wish to determine whether the new API is backwards compatible with an older version of the API.

Figure 1:
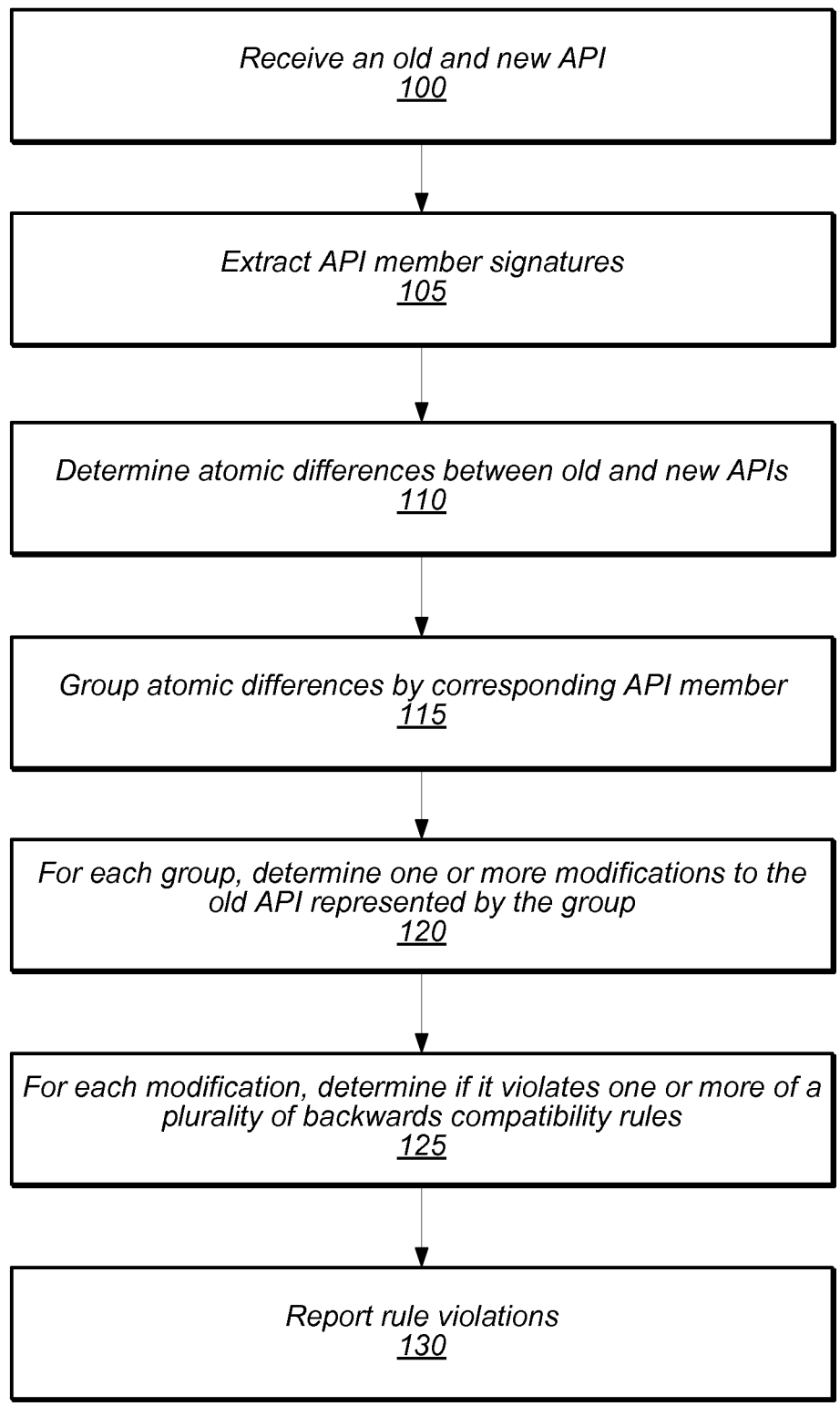
FIG. 1 is a flow diagram illustrating a computer-implemented method for automatically determining backwards compatibility between two APIs, according to some embodiments.

FIG. 1 is a flow diagram illustrating a computer-implemented method for automatically determining backwards compatibility between two APIs, according to some embodiments. In various embodiments, the method of FIG. 1 may be executed by a computer program.

According to the illustrated embodiment, the method of FIG. 1 may begin by receiving an old and new API, as in 100. Each API may include one or more API members. The term API member may refer to any entity exposed by the API, such as classes, methods/functions, variables, etc.). Various members may be exposed as public members of the API while others may have more restricted access (e.g., package scope).

In some embodiments, the APIs received in 100 may be in various forms. For example, in some embodiments, one or both APIs may be received as a representation of a computer program that implements the respective API. In various embodiments, a computer program that implements an API may be represented as machine code (e.g., binary), assembly code, and/or in any other high or low-level programming language. In various embodiments, binary representations may take the form of native binary and/or that of interpreted binary, such as Java™ byte-code.

In some embodiments, rather than receiving an API representation as an implemented computer program that implements the respective API, receiving step 100 may include receiving an interface description without a full implementation. For example, receiving an API as in 100 may include receiving a description of API members (e.g., classes, method/function signatures, class member variables, etc.) without necessarily receiving a full program implementation of the API. For example, receiving step 100 may include receiving an XML or free text description of one or more APIs.

In embodiments, each API member may be described with a signature. A member's signature may include such things as the member name, one or more access modifiers, parameter types, return types, containing class, and/or any other modifiers. For example, an example signature for a main method in a Java program (e.g., "public static void main(string[ ] args)") may include a name ("main"), an access modifier ("public"), a return type ("void"), parameter type ("string[ ]"), and a class modifier ("static"). In some embodiments, the signature may further identify the object type wherein the member is defined.

In some embodiments, receiving an old and new API in 100 may comprise receiving the signatures of the members of the APIs. For example, these may be provided in a plain text file, XML document, or other description. In other embodiments, one or more of the APIs received in 100 may be received as program implementations (e.g., as binary programs).

According to the illustrated embodiment, the APIs received in 100 may be scanned to extract API member signatures, as in 105. In some embodiments, the step of extracting API member signatures, as in 105, may be performed in a manner dependent on the format in which each API is received in 100. For example, if an API is received as a textual representation (e.g., XML, unformatted text, etc.) of the API members' signatures, then a scanner component may read the textual representation and build an in-memory model of the API. Similarly, in instances where an API is received in 100 as a source code program representation, then extracting the API member signatures in 105 may include parsing the source code to extract textual representations of each signature. Various techniques known in the art may be applied to perform this parsing. A particular technique may be applied depend on the programming language in which the source code representation is coded. In embodiments wherein an API is received as a binary representation of a program that implements the API, step 105 may include extracting API member signatures from the binary representation using binary parsing techniques.

In some embodiments, the output of step 105 for each API may be an in-memory representation of the API. However, in some embodiments, the in-memory representation may be serialized (e.g., in a file). Such techniques may enable the system to be more flexible and modular. For example, if an API received in 100 is in the form of a binary program representation, various third party tools may be used in 105 to convert the API signatures to a serialized representation. In one such example, if an API is received in 100 in the form of Java™ byte-code, the SigTest tool from Sun Microsystems may be used to analyze the program representation and to extract a golden signature file from it. The golden signature file may comprise a textual representation of the API, including the signatures for each of the API members. In some such embodiments, extracting API member signatures from a binary representation may include scanning the binary representation using an API scanner and creating an in-memory representation of the API as a reference model. In some embodiments, the reference model may subsequently be converted to a golden signature file using a model-writing component.

According to the illustrated embodiment, the API descriptions (either in-memory or in file) extracted in 105 from the API representations received in 100, may be analyzed to determine a set of atomic differences between the old and new API, as in 110. As used herein, the term atomic difference may refer to any signature that exists in one API but does not exist in the other. In various embodiments, a signature of a first API may be considered an atomic difference with a second API if the signature does not exactly match a corresponding member of the second API. For example, one atomic difference between an old and new API may be that the new API contains a specific function or variable that is not in the old API. In some embodiments, even if the same member name appears in both APIs, one or more atomic differences may be generated if the members are described using different modifiers, if the parameters are changed, and/or if any other part of the signature is different.

In some examples, a single modification between the old and new API may cause multiple atomic differences to be detected. For example, if a member variable named "var" exists in the older API with a public access modifier (e.g., public var) and appears in the new API with a different access modifier (e.g., protected var), then in some embodiments, two atomic differences may be detected. A first atomic difference may be that the old API contains a public variable named "var" that is absent from the new API and another atomic difference may be that the new API contains a protected variable named "var" that is not in the old API.

In some embodiments, tools such as SigTest from Sun Microsystems may be used to determine a set of atomic differences between the two APIs. According to one embodiment, SigTest may be usable to perform methods 100-110. In such an embodiment, the old and new APIs may be received in the form of byte-code representations of programs that implement the respective APIs. In some embodiments, the SigTest tool may then scan the byte-code to determine signatures for the members of each API and save the members in two golden signature files, each corresponding to a respective API. The SigTest tool may be further configured to analyze the two golden signature files to determine a set of atomic differences between the two APIs, as in 110. In other embodiments, a golden signature file for one API may be compared to a binary form (e.g., class, jar files) of the other API. In still other embodiments, the tool may compare a binary form of one API to a binary form of the other API. A temporary golden signature file may be generated for one API and compared with the other API.

Once the atomic differences between the old and new APIs have been determined, as in 110, the method of FIG. 1 may comprise grouping atomic differences according to the respective API member to which each refers, as in 115. For instance, in the example above, the two atomic differences (i.e., public var in the old API and protected var in the new API) both refer to the same API member (i.e., var). Therefore, they may be grouped in 115. In some instances, a group may comprise only a single atomic difference (e.g., when an API member not in the old API is introduced into the new API).

In various embodiments, different heuristics may be used to determine which atomic differences correspond to the analogous members of the respective APIs. For example, in one embodiment, differences may be matched by the API member name and/or to the type of member to which they refer (e.g., method vs. variable). In various embodiments, arbitrarily complex heuristics may be used.

According to the illustrated embodiment, after the atomic differences have been grouped, as in 115, the method may include determining one or more modifications to the old API represented by each group, as in 120. While atomic differences may identify signatures that are present in one API and not in another, modifications may represent semantic changes made to the older API in order to arrive at the newer API. As illustrated above, this may include modifications to members of the old API (including deletion) and/or additions to the new API.

In some instances, a group of atomic differences may be indicative of multiple modifications. For example, if the old API is the only one to contain the method "public double myMethod( )" while the new API is the only one to contain the method "protected int myMethod( )", then these two atomic differences may be grouped in 115 since they may be in reference to the same API member method myMethod( ). In 120, it may be further determined that this group is indicative of two modifications: (1) access modifier of myMethod( ) was changed from public to protected and (2) return type of myMethod( ) changed from double to int. In some embodiments, the two atomic differences may not be grouped at all, depending on the grouping heuristics employed in 115.

According to the illustrated embodiment, once the modifications have been determined, the method may comprise determining, for each modification, whether it violates one or more of a plurality of backwards compatibility rules, as in 125. In some embodiments, step 125 may include comparing each modification against the same set of backwards compatibility rules. In other embodiments, each modification may be classified according to some criteria (e.g., type of API members to which each is applied) and the modifications in each classification may be compared against a respective set of compatibility rules corresponding to the classification.

As shown in the illustrated embodiment, any violations of backwards compatibility rules may be reported, as in 130. According to various embodiments, reporting rule violations, as in 130, may include creating a compatibility report, displaying the compatibility report in a user interface, printing the compatibility report, and/or saving the compatibility report to a file.

In various embodiments, the compatibility report may contain different information. For example, in one embodiment, the compatibility report may contain information identifying one or more of the modifications that violate at least one compatibility criterion. A compatibility report may further identify one or more of: the compatibility rule violated by each of the modifications, the severity of the violation, the scope of the compatibility issue (as described below), information usable to locate each modification, and/or suggestions for possible fixes.

As described above, the method of FIG. 1 may include, at 125, determining for each modification whether it violates one or more of a plurality of backwards compatibility rules. Various embodiments may utilize different sets of compatibility rules, which may take various forms.

Figure 2:
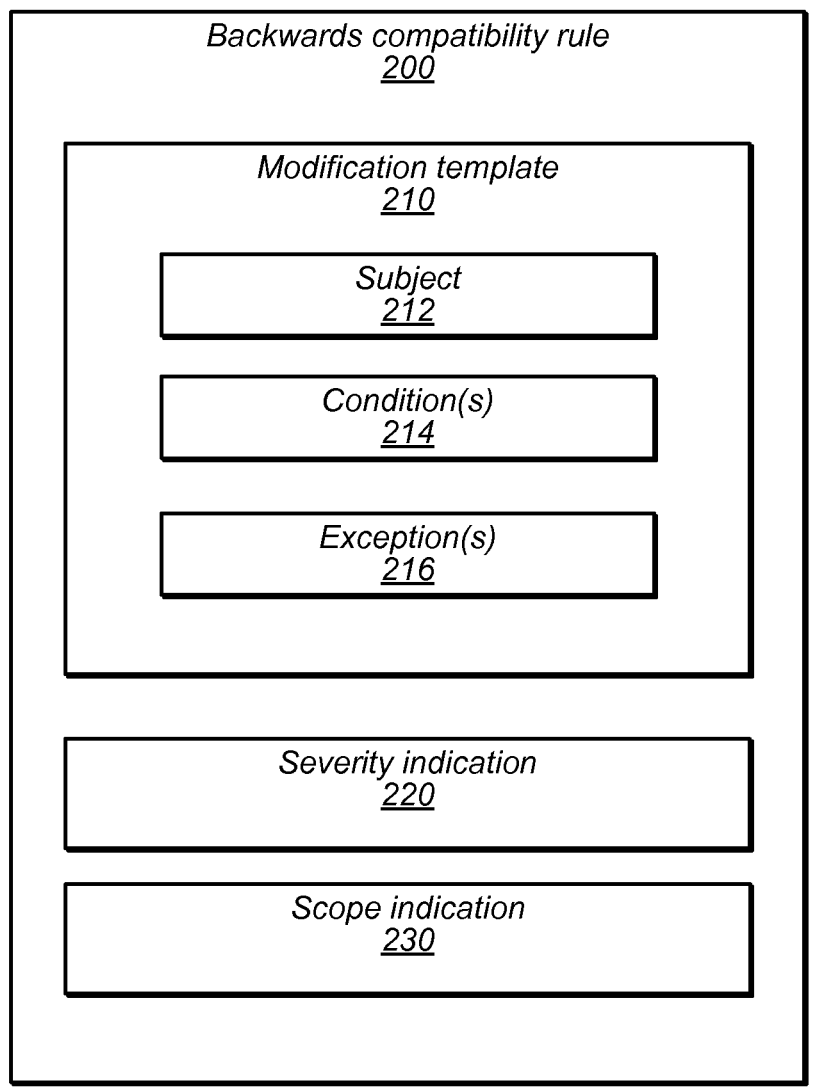
FIG. 2 is a block diagram illustrating an example of a backwards compatibility rule, according to some embodiments.

FIG. 2 is a block diagram illustrating an example of a backwards compatibility rule, according to some embodiments. In the illustrated embodiment, backwards compatibility rule 200 includes modification template 210, severity indication 220, and scope indication 230.

In such embodiments, modification template 210 may include information usable to determine whether a given modification matches (i.e., violates) backwards compatibility rule 200. In some embodiments, a modification template (such as 210) may comprise a subject (such as 212), one or more conditions (such as 214), and zero or more exceptions (such as 216). In some embodiments, subject 212 may correspond to a type of modification. For example, one subject may be "adding or removing API members", "modifying member visibility", "modifying constants", "changing modifiers", etc.

In other embodiments, subject 212 may refer to particular API members. For example, in such embodiments, an example subject may be "all classes", "all interfaces", "all instance variables", "all types", "all API members", etc.

According to the illustrated embodiment, modification template 210 may further comprise conditions 214, which may identify circumstances in which changes to the subject may breaks backwards compatibility. For instance, in the example above regarding changing the visibility of member var from public to protected, the subject may correspond to "instance variables" while the condition may correspond to "narrowing visibility from public to non-public".

In alternate embodiments, wherein subjects are condition types, the subject may correspond to "modifying member visibility" while the condition corresponds to "narrowing from public to non-public". For the purposes of this disclosure, embodiments wherein subjects indicate API member types will be discussed henceforth. However, this is for purposes of clarity and is not intended to be limiting.

According to the illustrated embodiment, modification template 210 of backwards compatibility rule 200 may optionally comprise any number of exceptions 216. Exceptions 220 may define exceptions to the rule such that if a given modification matches one or more of conditions 214 and also one or more of exceptions 216, then the given modification would not match modification template 210 and therefore not be a violation of backwards compatibility according to rule 200.

To illustrate an example of an exception, suppose that backwards compatibility rule 200 is configured to detect modifications that narrow an API member's visibility in a manner that breaks backwards compatibility. In one such example, subject 212 may be "any API member" while condition 214 may be "narrowing visibility from protected to private". This modification template would match any modification that narrows an API member's visibility from protected to private. However, it may be that not all such modifications cause a backwards compatibility problem. For example, narrowing the visibility of a class that has no public constructor from protected to private may not cause a backwards compatibility issue. Therefore, exceptions 216 may indicate this exception by indicating that the rule does not apply to classes that do not have public constructors. In this case, exceptions 216 may also include further exceptions, such as for narrowing protected visibility of a member (e.g., variable, method) of a final class, of an enumerated type, or of another circumstance that would not break backwards compatibility.

According to the illustrated embodiment, backwards compatibility rule 200 may further include severity indication 220, which may be used to indicate a level of severity for violating the backwards compatibility rule. In different embodiments, the severity of violating different backwards compatibility rules may be different. For example, in some instances, violating a backwards compatibility rule may cause systems configured to rely on the older API to malfunction while violating other compatibility rules may not necessarily cause a malfunction. In some implementations, severity indication 220 may be configured to indicate one of at least two levels of severity: a critical level indicating that a modification violating the rule does cause a backwards compatibility problem and a warning level indicating that a modification violating the rule may cause a backwards compatibility problem. In various embodiments, different severity indication values may be possible.

As in the illustrated embodiment, backwards compatibility rule 200 may further comprise scope indication 230. In some embodiments, scope indication 230 may be used to indicate whether a modification matching the rule would cause a backwards compatibility problem for applications during compilation time (source code scope) or during runtime (binary code scope), or both.

A backwards compatibility problem at the source code scope may cause a problem that is detectable statically by analyzing the source code of an application that is configured to use the older API. That is, if the new API has a backwards compatibility problem at the source code scope, an application written to use the old API may not compile when the old API is replaced with the new API.

A backwards compatibility problem at the binary scope may cause a problem that is detectable only at runtime. For example, a program that is configured to utilize the old API may still compile with the new API, even if the new API has compatibility problems at the binary scope. However, the compatibility issues may cause the program to malfunction at runtime, such as by throwing a runtime exception.

Thus, each backwards compatibility rule may specify a level of severity and a scope for the problems caused by a modification violating that rule.

In various embodiments, the set of backwards compatibility rules, including subjects, conditions, exceptions, severity indication, and/or scope may be dependent on the programming language and/or the platform that implements the API and/or that implements a given program configured to utilize the API. For example, the backwards compatibility rules below may be used for determining backwards compatibility for APIs written in the Java™ programming language:

Subject: All members
Condition: API (public or protected) type or member (method, field) added
Scope: Source
Severity: Warning
Subject: All members
Condition: API (public or protected) type (class, interface, enum, annotation type) or member (method, field) removed
Scope: Source and Binary
Severity: Critical
Subject: All members
Condition: Narrowing type or member visibility—from public to non-public, from protected to package or private
Scope: Source and Binary
Severity: Critical
Subject: Interfaces and annotation types
Condition: Add methods
Scope: Source and Binary
Severity: Critical
Subject: Interface and Annotation types
Condition: Field added
Scope: Source and Binary
Severity: Critical
Subject: Interface and Annotation types
Condition: Expand the set of superinterfaces (direct or indirect)
Exception: The added interface has no field (constant)
Scope: Source
Severity: Warning
Subject: Interface and Annotation types
Condition: Contract superinterface set (direct or inherited)
Scope: Source and Binary
Severity: Warning
Subject: Interface and Annotation types
Condition: Add member to annotation type
Exception: Member has default value
Scope: Source
Severity: Critical
Subject: Interface and Annotation types
Condition: Remove member from annotation type
Scope: Source and Binary
Severity: Critical
Subject: Interface and Annotation types
Condition: Remove default value from member of annotation type
Scope: Source and Binary
Severity: Critical
Subject: Interface and Class methods
Condition: change signature and/or return type
Scope: Source and Binary
Severity: Critical
Subject: Interface and Class methods
Condition: Change last parameter from array T . . . to array type T[ ]
Scope: Source
Severity: Critical
Subject: Interface and Class methods
Condition: Change normalized throw list
Scope: Source
Severity: Critical
Subject: Interface and Class methods
Condition: Decrease access from public to protected
Scope: Source and Binary
Severity: Critical
Subject: Interface and Class methods
Condition: Increase access from protected to public
Exception: The class is not subclassable
Scope: Source
Severity: Warning
Subject: Interface and Class methods
Condition: Change method from non-abstract to abstract
Exception: The class cannot be subclassed
Scope: Source and Binary
Severity: Critical
Subject: Interface and Class methods
Condition: Change method from non-final to final
Scope: Source and Binary Severity: Critical
Subject: Interface and Class methods
Condition: Change method from static to non-static
Scope: Source and Binary
Severity: Critical
Subject: Interface and Class methods
Condition: Change method from non-static to static
Scope: Source and Binary
Severity: Critical
Subject: Interface and Class Fields
Condition: Change type
Scope: Source and Binary
Severity: Critical
Subject: Interface and Class Fields
Condition: Change/Remove constant value
Scope: Source and Binary
Severity: Warning
Subject: Interface and Class Fields
Condition: Decrease access
Scope: Source and Binary
Severity: Critical
Subject: Interface and Class Fields
Condition: Change from non-final to final
Scope: Source and Binary
Severity: Critical
Subject: Interface and Class Fields
Condition: Change from static to non-static
Scope: Source and Binary
Severity: Critical
Subject: Interface and Class Fields
Condition: Change from non-static to static
Scope: Source and Binary
Severity: Critical
Subject: Classes
Condition: Add non-abstract and non-static methods
Scope: Source and Binary
Severity: Warning
Subject: Classes
Condition: Add abstract methods
Exception: the class cannot be subclassed
Scope: Source and Binary
Severity: Critical
Subject: Classes
Condition: Add static methods
Exception: The class cannot be subclassed
Scope: Source and Binary
Severity: Warning
Subject: Classes
Condition: Remove constructor(s)
Scope: Source and Binary
Severity: Critical
Subject: Classes
Condition: Add first constructor with arguments or throws clause
Scope: Source and Binary
Severity: Critical
Subject: Classes
Condition: Add fields
Scope: Source and Binary
Severity: Critical
Subject: Classes
Condition: Expand implemented interface set (direct or indirect) and the added interface(s) add abstract method(s)
Scope: Source and Binary
Severity: Critical
Subject: Classes
Condition: Expand implemented interface set (direct or indirect) and the new interface(s) adds field(s) or inner class(es)
Scope: Source and Binary
Severity: Critical
Subject: Classes
Condition: Contract implemented interface set (direct or indirect)
Scope: Source and Binary
Severity: Critical
Subject: Classes
Condition: Contract super-class set (direct or indirect)
Scope: Source and Binary
Severity: Critical
Subject: Classes
Condition: Change non-abstract to abstract
Exception: The class cannot be subclassed
Scope: Source and Binary
Severity: Critical
Subject: Classes
Condition: Change non-final to final
Scope: Source and Binary
Severity: Critical In some embodiments, the rule set above may be used to determine if a new version of a given Java™ API is compatible with an older version. In some embodiments, such as that illustrated in FIG. 3, the rules above may be combined with the SigTest tool of Sun Microsystems for determining backwards compatibility of two versions of an API.

Figure 3:
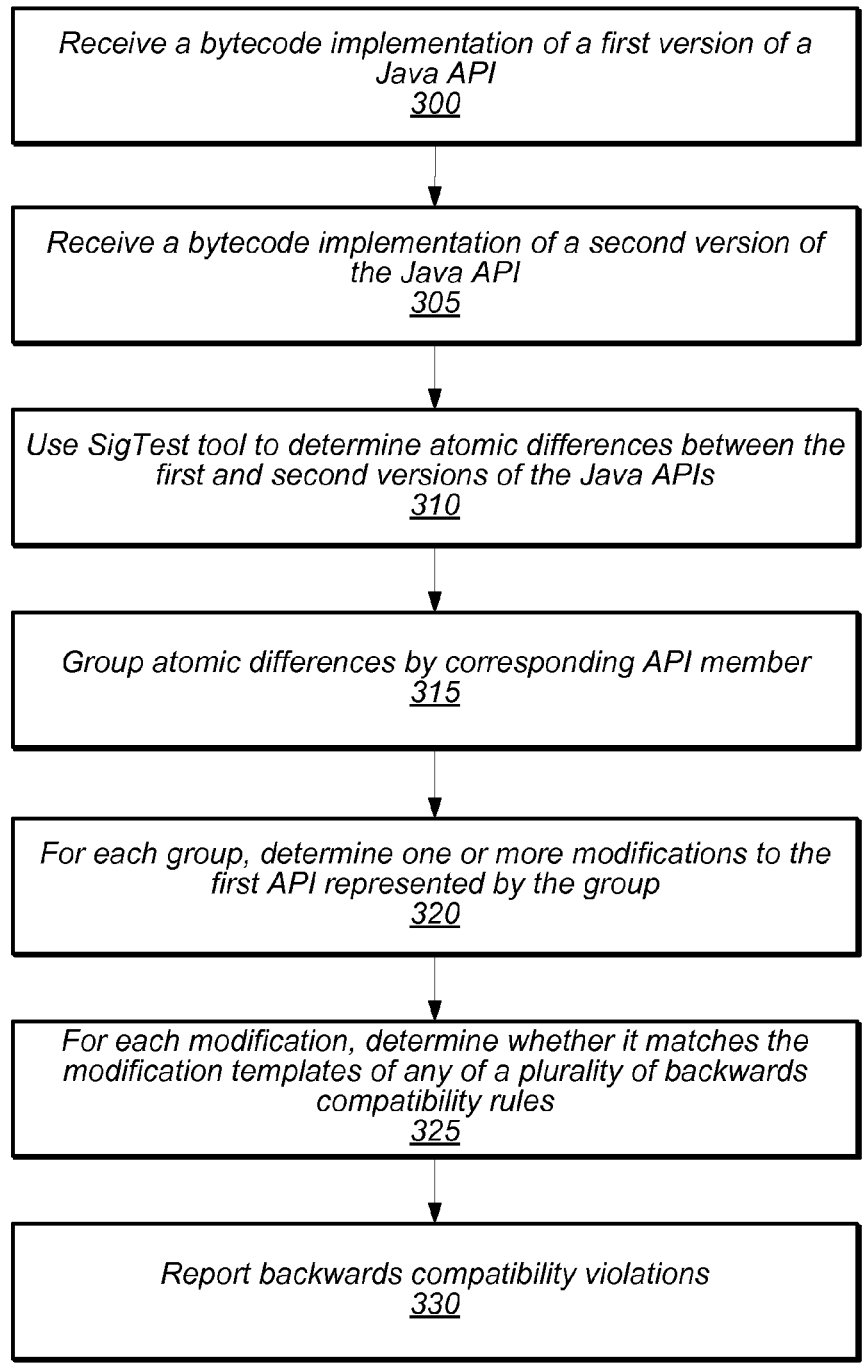
FIG. 3 is a flow diagram illustrating a method for determining the backwards compatibility of two Java™ API implementations, according to some embodiments.

FIG. 3 is a flow diagram illustrating a method for determining the backwards compatibility of two Java™ API implementations, according to some embodiments. According to the illustrated embodiment, the method may begin by receiving a byte-code (i.e., binary) implementation of a first version of a Java™ API, as in 300, and a second version of the Java™ API, as in 305. In various embodiments, these API implementations may be of any computer programs, platform, and/or other entities capable of exposing an API.

Once the two API implementations have been received (as in 300 and 305), the method may comprise using the known SigTest tool to determine a set of atomic differences between the received first and second versions of the API, as in 310. As described earlier, the SigTest tool may produce a golden signature file for each of the received API implementations, which may contain various signatures for every member of the respective API, including variables, methods, classes, etc. In other embodiments, a golden signature file for one API may be compared to a binary form (e.g., class, jar files) of the other API. In still other embodiments, the tool may compare a binary form of one API to a binary form of the other API. A temporary golden signature file may be generated for one API and compared with the other API. In the illustrated embodiment, the atomic differences of 310 may comprise indications of each interface element that does not appear exactly in both of the received API implementations.

According to the illustrated embodiment, the method may then involve grouping the atomic differences into groups of one or more according to the respective API member to which the differences refer, as in 315. For example, a method signature that appears in the first version of the API but not in the second may correspond to the same method as a second method signature that appears in the second version of the API but not in the first. In such a case, the two signatures may be grouped in 315.

In 320, the illustrated method comprises examining each group and determining one or more modifications to the old API represented by each group. For example, in the case above where two method signatures were grouped as referring to the same method, determining one or more modifications to the first API may, in various cases, include such determinations as whether the method's visibility was changed, whether its scope was changed from static to non-static, and/or various other modifications.

According to the illustrated embodiment, in 325, each modification determined in 320 may be matched against a plurality of backwards compatibility rules, such as those listed above, to determine if the modification matches one or more of the rules. In some embodiments, the method may include reporting any or all such matches as backwards compatibility violations, as in 330. According to various embodiments, reporting backwards compatibility violations, as in 330, may include creating a compatibility report, displaying the compatibility report in a user interface, printing the compatibility report, and/or saving the compatibility report to a file. In various embodiments, the file may be in plain text, XML, or in any other format and may contain different information, as outlined above with respect to element 130 of FIG. 1.

Figure 4:
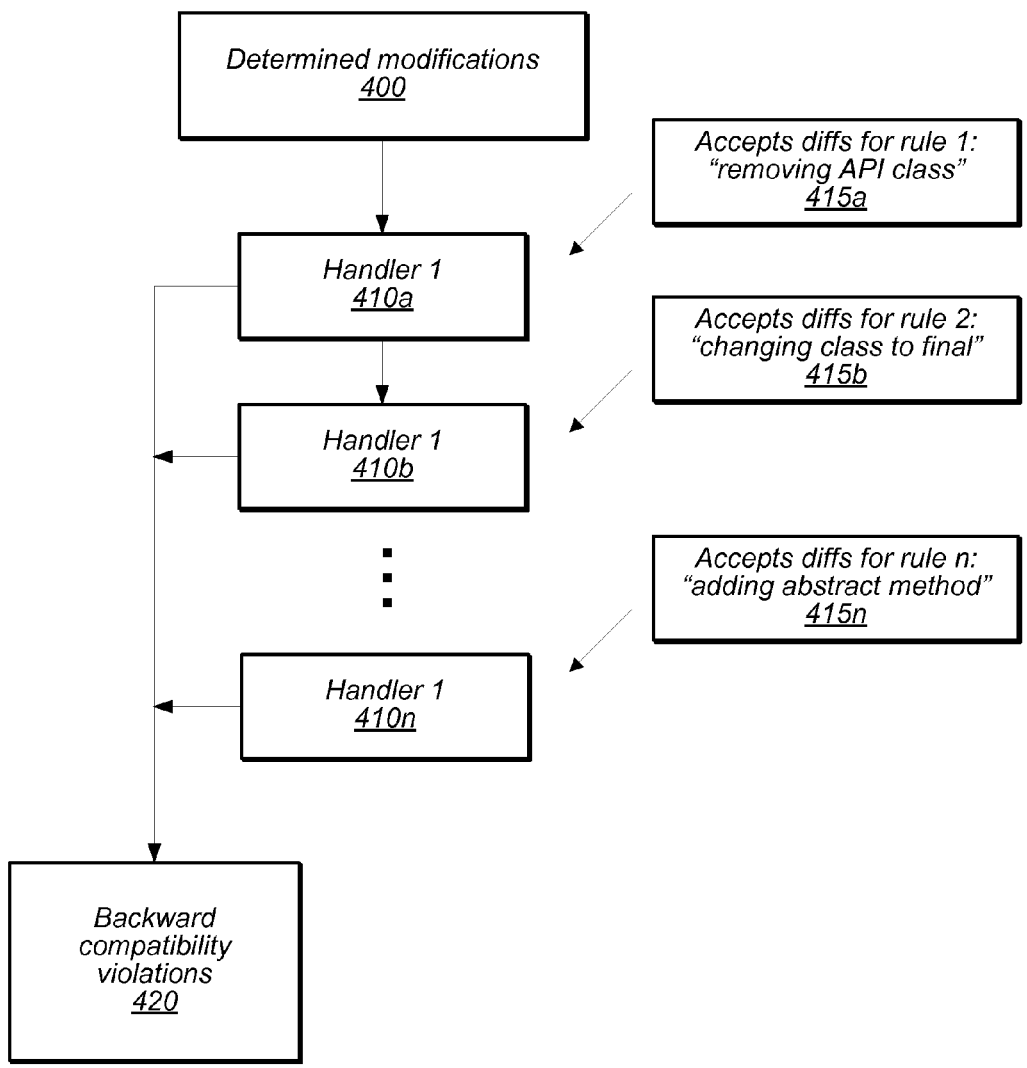
FIG. 4 illustrates a method for determining whether a given modification matches the modification templates of any of a plurality of backwards compatibility rules, according to various embodiments.

FIG. 4 illustrates a method for determining whether a given modification matches the modification templates of any of a plurality of backwards compatibility rules, according to various embodiments. In some embodiments, the method of FIG. 4 may be performed as part of step 325 in FIG. 3.

According to the illustrated embodiment of FIG. 4, each rule (e.g., 415a-415n) may be represented and/or embodied by a respective handler (e.g., 410a-410n). In some embodiments, rules 415a-415n may each include a modification template, severity indication, and/or scope indication, such as in the data structure of FIG. 2. In some embodiments, such as those configured to determine the backwards compatibility between two implementations of a given Java™ API, the n rules may correspond to the rules enumerated above.

Each handler 410a-410n may be configured to determine whether a given modification matches the respective rule represented by that handler. In various embodiments, handlers 410 may process the determined modifications in different orders and/or patterns. For example, in some embodiments, handlers 410 may be arranged in a chain of responsibility pattern, such as that illustrated in FIG. 4. That is, given a set of modifications to the API (such as 400), each modification may be compared successively by each handler 410a-410n to a corresponding rule 415a-415n. Each time a handler matches a modification of 400 to a rule 415, the handler may note the match as a backwards compatibility violation in 420.

Numerous variations are possible. For example, in some embodiments, each modification may be processed by every handler, regardless of the result from each handler (e.g., violation or non-violation). In other embodiments, a modification that matches a rule of a given handler may not be processed by a subsequent handler. In such embodiments, the modification templates of rules may be interrelated with the order of the handlers.

In other embodiments, the handlers may be configured to process the modifications in parallel. For example, handler 410a may be configured to process a first modification of 400 while handler 410b processes a different modification of 400. Later, each handler may process the other modification. In such embodiments, the processing task may be faster due to the parallel processing.

In some embodiments, the handlers may process the determined modifications (as in the illustrated embodiment of FIG. 4) while in other embodiments each handler may operate on the atomic differences (e.g., output of 310) and/or on groups of atomic differences (e.g., output of 315).

In some embodiments, all of the modifications may be processed before a backwards compatibility report is generated, as in 330. A backwards compatibility report may be generated by examining backwards compatibility violations 420, which result from the processing of modifications 400 by handlers 410.

Figure 5:
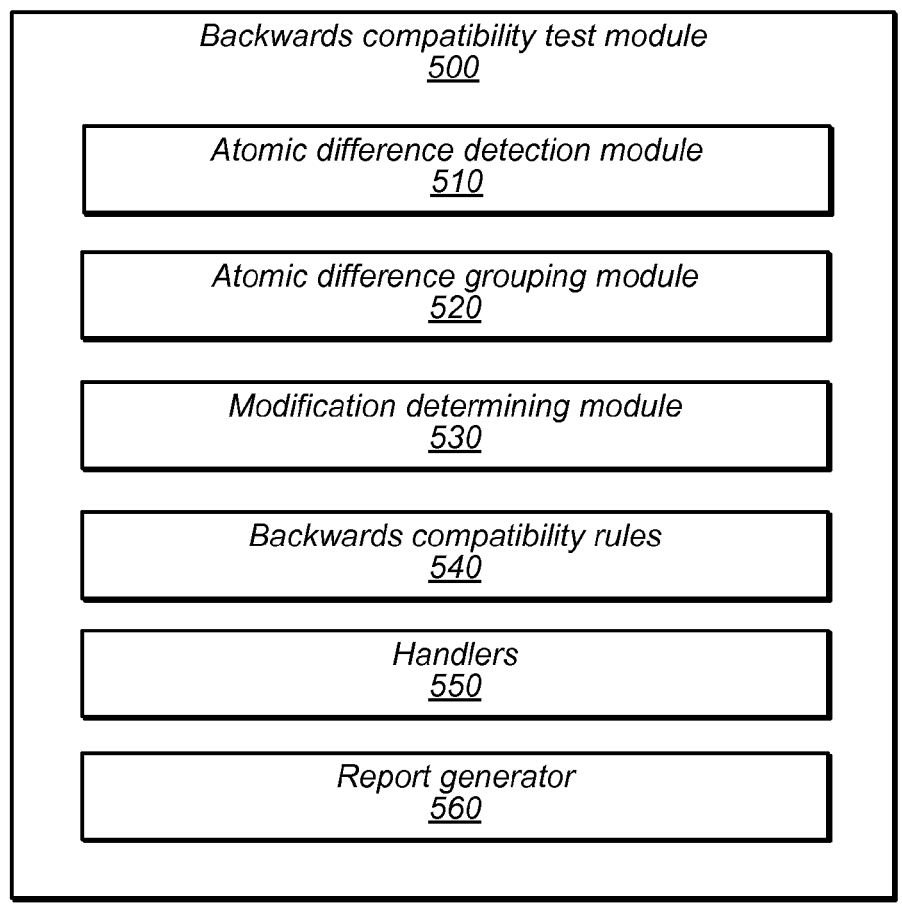
FIG. 5 is a block diagram illustrating a backwards compatibility test module configured to determine whether a given version of an API is compatible with an earlier version, according to some embodiments.

FIG. 5 is a block diagram illustrating a backwards compatibility test module configured to determine whether a given version of an API is compatible with an earlier version, according to some embodiments. According to the illustrated embodiment, backwards compatibility module 500 may include atomic difference detection module 510. In some embodiments, atomic difference detection module 510 may implement functionality to extract API member signatures from two APIs and determine those signatures that do not exist in both APIs. In some embodiments, some or all of atomic difference detection module 510 may be implemented by the SigTest tool.

Backwards compatibility test module 500 may further comprise atomic difference grouping module 520, which may be configured to group the atomic differences between the two received APIs according to subject. Test module 500 may further include modification determining module 530, which may be configured to determine one or more modifications made between the old and new APIs to produce the atomic differences.

Backwards compatibility test module 500 may further comprise a plurality of backwards compatibility rules 540 and corresponding handlers 550. In some embodiments, there may be a one-to-one and onto correspondence between backwards compatibility rules 540 and handlers 550. In some embodiments, backwards compatibility test module 500 may further comprise a report generator 560, which may be capable of generating a backwards compatibility report for two given APIs, based on backwards compatibility rules 540.

Figure 6:
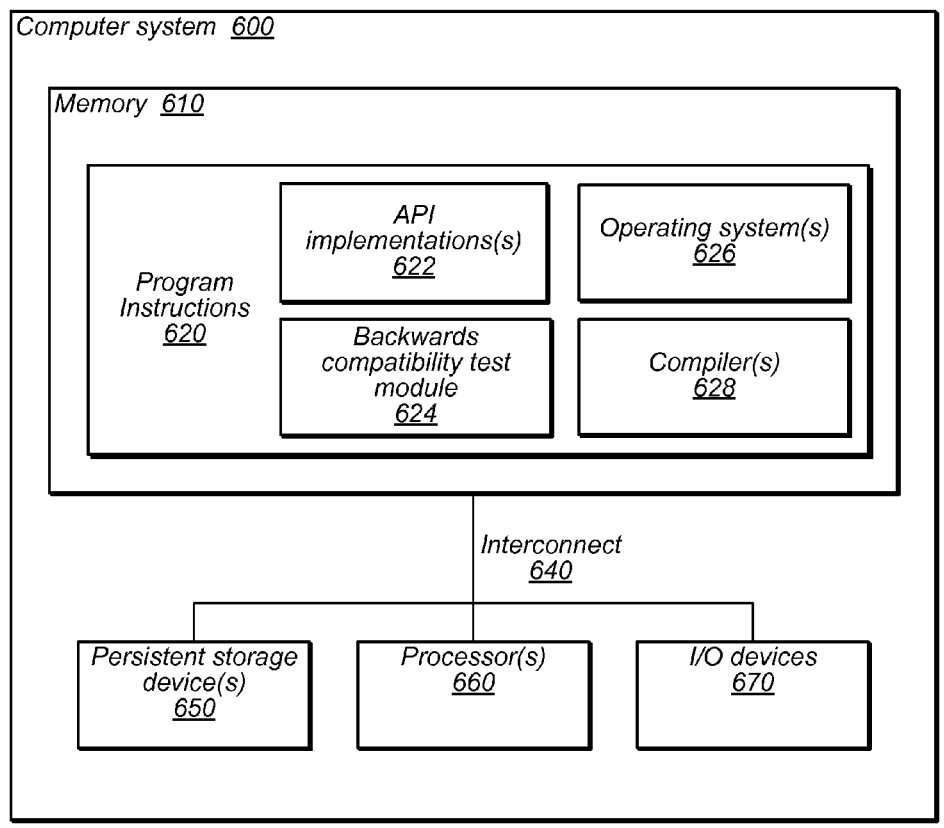
FIG. 6 illustrates a computer system configured to implement API backwards compatibility checking as described herein, according to various embodiments.

FIG. 6 illustrates a computer system configured to implement API backwards compatibility checking as described herein, according to various embodiments. The computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The API backwards compatibility checking components and methods described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 600 may include one or more processors 660, each of which may include multiple cores, any of which may be single or multi-threaded. The computer system 600 may also include one or more persistent storage devices 650 (e.g. optical storage, magnetic storage, hard drive, tape drive, solid state memory, etc), which may persistently store data such as rules and/or API implementations.

Computer system 600 may further comprise any number of I/O devices, such as 670. For example, I/O devices 670 may include one or more monitors, keyboards, speakers, etc.

According to the illustrated embodiment, computer system 600 may include one or more memories 610 (e.g., one or more of cache, SRAM, DRAM, RDRAM, EDO RAM, DDR 10 RAM, SDRAM, Rambus RAM, EEPROM, etc.). The one or more processors 660, the storage device(s) 650, I/O devices 670, and the system memory 610 may be coupled to an interconnect 640. Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

One or more of the system memories 610 may contain program instructions 620. Program instructions 620 may be encoded in platform native binary, any interpreted language such as Java™ byte-code, or in any other language such as C/C++, Java™, etc or in any combination thereof. Program instructions 620 may include program instructions executable to implement two or more APIs 622 that may be tested against one another for backwards compatibility. In other embodiments, one or more APIs may be provided in forms other than as one of implementations 622 (e.g., as a golden signature file).

Program instructions 620 may further comprise a backwards compatibility test module 624, which may be configured to analyze API implementations 622 for backwards compatibility issues with respect to another of API implementations 622. In some embodiments, backwards compatibility test module 624 may correspond to backwards compatibility test module 500 of FIG. 5.

In some embodiments, program instructions 620 may further comprise one or more operating systems 626 for executing software on computer system 600. Program instructions 620 may further comprise one or more compilers, which may be used to parse, interpret, and/or compile source code representing various API implementations.

Although the embodiments above have been described in considerable detail, numerous variations and modifications will become apparent to those skilled in the art once the above disclosure is fully appreciated. For example, various techniques and rule sets may be used to determine compatibility checking dependent on the given language and/or platform on which the candidate APIs are implemented. It is intended that the following claims be interpreted to embrace all such variations and modifications.

What is claimed:

1. A non-transitory computer-readable storage medium storing program instructions executable by one or more processors to implement:
    comparing a representation of a first version of an API with a representation of a second version of the API to determine a set of atomic differences between the two versions, wherein said comparing produces a set of atomic differences representing one or more modifications made between the first and second versions of the API;
    applying a set of a backwards compatibility rules to the set of atomic differences, wherein each of the backwards compatibility rules corresponds to a respective handler, and wherein each handler is configured to determine whether a given modification matches the respective rule represented by that handler, and wherein said applying comprises, for each atomic difference:
        analyzing the atomic difference to determine one or more of the set of backwards compatibility rules applicable to the atomic difference; and
        evaluating each applicable backwards compatibility rule for the atomic difference to determine whether the atomic difference represents one or more backwards compatibility violations, wherein said evaluating comprises processing the atomic differences by using the respective handler; and
        storing an indication of any backwards compatibility violations from said evaluating.

2. The non-transitory computer-readable storage medium of claim 1, wherein the method further comprises: storing the atomic differences in a text file.

3. The non-transitory computer-readable storage medium of claim 1, wherein:
    said applying comprises grouping two or more of the set of atomic differences as a modification to a single, common member of the first and second versions of the API; and
    said analyzing comprises determining whether the modification violates any of the set of backwards compatibility rules, wherein said determining comprises comparing the modification to one or more modification templates of the backwards compatibility rules.

4. The non-transitory computer-readable storage medium of claim 3, wherein the indication includes a correlation between the modification and at least one of the set of backwards compatibility rules it violates.

5. The non-transitory computer-readable storage medium of claim 1, wherein the indication includes a correlation between an atomic difference and a backwards compatibility violation represented by that atomic difference.

6. The non-transitory computer-readable storage medium of claim 1, wherein said indication includes: for each violation, an indication of whether the violation would cause a compilation or linking error when attempting to compile a computer program using the second version of the API.

7. The non-transitory computer-readable storage medium of claim 1, wherein at least one of the set of backwards compatibility rules indicates an exception to the rule.

8. The non-transitory computer-readable storage medium of claim 1, wherein said comparing comprises comparing respective binary implementations of the first and second APIs.

9. The non-transitory computer-readable storage medium of claim 8, wherein the binary implementations comprise Java byte-code.

10. The non-transitory computer-readable storage medium of claim 1, wherein at least one of the plurality of backwards compatibility rules is applied only to a specified subset of API member types.

11. The non-transitory computer-readable storage medium of claim 1, wherein the handlers are arranged in a chain of responsibility pattern.

12. A computer-implemented method, comprising:
    comparing a representation of a first version of an API with a representation of a second version of the API to determine a set of atomic differences between the two versions, wherein said comparing produces a set of atomic differences representing one or more modifications made between the first and second versions of the API;

applying a set of a backwards compatibility rules to the set of atomic differences, wherein each of the backwards compatibility rules corresponds to a respective handler, and wherein each handler is configured to determine whether a given modification matches the respective rule represented by that handler, and wherein said applying comprises, for each atomic difference:

analyzing the atomic difference to determine one or more of the set of backwards compatibility rules applicable to the atomic difference; and evaluating each applicable backwards compatibility rule for the atomic difference to determine whether the atomic difference represents one or more backwards compatibility violations, wherein said evaluating comprises processing the atomic differences by using the respective handler; and storing an indication of any backwards compatibility violations from said evaluating.

13. The computer-implemented method of claim 12, wherein at least one of the set of backwards compatibility rules indicates an exception to the rule.

14. The computer-implemented method of claim 12, wherein said comparing comprises comparing respective binary implementations of the first and second APIs.

15. The computer-implemented method of claim 12, wherein at least one of the set of backwards compatibility rules is applied only to a specified subset of API member types.

16. A computer system, comprising:

one or more processors;

a memory coupled to the one or more processors and storing program instructions executable by the one or more processors to implement:

comparing a representation of a first version of an API with a representation of a second version of the API to determine a set of atomic differences between the two versions, wherein said comparing produces a set of atomic differences representing one or more modifications made between the first and second versions of the API;

applying a set of a backwards compatibility rules to the set of atomic differences, wherein each of the backwards compatibility rules corresponds to a respective handler, and wherein each handler is configured to determine whether a given modification matches the respective rule represented by that handler, and wherein said applying comprises, for each atomic difference:

analyzing the atomic difference to determine one or more of the set of backwards compatibility rules applicable to the atomic difference; and evaluating each applicable backwards compatibility rule for the atomic difference to determine whether the atomic difference represents one or more backwards compatibility violations, wherein said evaluating comprises processing the atomic differences by using the respective handler; and storing an indication of any backwards compatibility violations from said evaluating.

17. The computer-readable storage medium of claim 1, wherein the indication includes an indication of the severity of any backwards compatibility violations found in said evaluating.

18. The computer-implemented method of claim 12, wherein the indication includes an indication of the severity of any backwards compatibility violations found in said evaluating.

19. The computer system of claim 16, wherein the indication includes an indication of the severity of any backwards compatibility violations found in said evaluating.

\* \* \* \* \*